Patented Aug. 19, 1941

2,253,088

UNITED STATES PATENT OFFICE 2,253,088

ART OF PREPARING DERIVATIVES OF ANARCARDIC ACID

Emil E. Novotny, Oak Lane, and George Karl Vogelsang, Frankford, Pa., assignors to Durite Plastics, Incorporated, Philadelphia, Pa., a corporation of Pennsylvania No Drawing. Application August 4, 1937, Serial No. 157,394

14 Claims. (Cl. 260—46)

The present invention relates to the art of preparing derivatives of anacardic acid, and has particular reference to certain new and very useful products obtained by heating anacardic acid or materials containing or derived from anacardic acid with one or more amines under suitably controlled reaction conditions.

Anacardic acid is the principal ingredient of the shell liquid of the cashew nut (Anacardium occidentale). The acid comprises about 90% of the shell liquid, the other 10% being chiefly cardol.

It should be stated at this point that this invention does not concern itself with the so-called salts of anacardic acid (anacardates), which are comparable to organic salts of the type of aniline hydrochloride or acetate. Amines such as aniline do react with anacardic acid or cashew nut shell liquid when they are mixed together. However, the reaction is far from being vigorous and does not go to completion, the resulting solution containing an admixture of anacardic acid, aniline, aniline anacardate, etc. On the contrary this invention has to do with the more complex interreaction products between anacardic acid and amines, the reaction mechanism being of a substantially non-reversible character, i. e. neither the amine nor the anacardic acid can be recovered from the resultant product.

In its broadest aspect, the method of preparing amine derivatives of anacardic acid in accordance with the present invention consists in heating anacardic acid or a material containing or derived from anacardic acid with one or more amines under suitably controlled reaction conditions.

As an example of a material containing anacardic acid which may be used in practicing our invention may be mentioned cashew nut shell liquid. As examples of suitable derivatives of anacardic acid that may be employed may be mentioned the crude or purified esters of anacardic acid. These esters may be prepared by any of the various methods described in our prior application Serial No. 149,098 filed June 17, 1937.

The reaction between anacardic acid and the amines is quite general, and practically all aliphatic, aromatic and heterocyclic amines, whether of a primary or secondary character, may be utilized in carrying out the process.

As specific examples of aliphatic amines which we may use may be mentioned ethylenediamine, diethylenetriamine, morpholine, triethylenetetramine, the butylamines, the propylamines, tetraethylenepenta-amine, propylenediamine, etc.

As specific examples of aromatic amines suitable for use in our process may be mentioned aniline, the toluidines, the xylidines, benzylamine, the naphthylamines, the amines of anthracene and phenanthrene, etc.

As specific examples of secondary amines, simple or mixed, which may be used in the process may be mentioned methylaniline, dimethylamine, diethylamine, diphenylamine, methylphenylamine, ethylphenylamine, etc.

In addition to the above examples may be mentioned the amines of substituted methanes such as the amines of mono-, di-, and triphenylmethanes as well as the amines of other ring compounds such as the furfurylamines.

It is to be noted that the compounds suitable for use in our process may contain in the molecule other additive or substitution elements or groups including one or more of the following: elements such as halogen, sulphur, etc., or groups such as carboxyl, aldehyde, alcohol, hydroxyl, ketone, methyl, acetyl, phenyl, sulphonic etc. This is particularly so in the case of amines of the aromatic series.

The proportions of the reagents and the specific details of procedure depend to a large extent upon whether the amine used in the reaction is readily or difficultly distillable.

The following is the preferred procedure in the case of a volatile or readily distillable amine such as aniline or o-toluidine:

The amine and the anacardic acid are mixed, the amine being considerably in excess of molecular proportions. Suitable proportions are one part of the anacardic acid to two of the amine. In the case of aniline and o-toluidine, this represents about eight times the amount of amine which would correspond to molecular proportions. The molecular weight of anacardic acid is approximately 344, and Cnsl may be considered as having an equivalent molecular weight of about 400.

The temperature of the mixture is raised to between 212° and 250° F., and the mixture is refluxed at that temperature for about two hours. The temperature is then slowly raised, the distillate being condensed and collected. The distillate separates into two layers, the lower layer consisting primarily of water and the upper layer being fairly pure amine. The apparatus may be so arranged that the amine layer is siphoned back to the reaction vessel, thus providing a circulatory system. When the temperature has reached the range of 450° to 500° F., the reaction is considered complete. The fact that the final temperature is considerably above the boiling point of the amine renders it certain that no appreciable quantity of free amine remains in the reaction product.

The following is the preferred procedure in the case of a non-volatile or difficultly distillable amine such as b-naphthylamine:

The amine and the anacardic acid are mixed, the amine being present slightly in excess of molecular proportions. An excess of about 10% is generally preferred. The mixture is brought up to boiling temperature (212° to 250° F.), and refluxed for about two hours. Distillation is then permitted to proceed and the temperature is gradually raised to between 500° and 600° F. until practically all the uncombined materials including amine, carbon dioxide and water is driven off. The residue is the reaction product of the particular amine with anacardic acid.

The foregoing illustrative methods are carried out at atmospheric pressure. We may carry the process out at pressures above atmospheric, but for most purposes we prefer not to exceed 10 atmospheres, though it is practical to carry out the process at much higher pressures, e. g. 50 atmospheres. Pressure above atmospheric are particularly desirable when volatile amines are employed in the process, especially when it is not desired to employ an excess of amine.

As has been stated, the process of the invention is applicable not only to anacardic acid itself but also to cashew nut shell liquid, and to the crude and purified esters of anacardic acid. Hence, it is to be understood that in each of the foregoing examples, cashew nut shell liquid or the esters of anacardic acid may be used instead of the anacardic acid.

The products made in accordance with the foregoing illustrative methods range from liquids with a viscosity somewhat higher than that of Cnsl to soft solids, depending upon the molecular weight of the amine employed. Thus, the reaction products derived from aniline and its lower homologues are liquids, while those derived from the amines of naphthalene, anthracene and phenanthrene are soft solids.

It can be readily demonstrated that the products of the invention are definite stable derivatives of anacardic acid. If ordinary Cnsl is refluxed at atmospheric pressure for about two hours, and is then slowly subjected to a gradually increasing temperature until an ultimate temperature of about 500° F. is attained, it is found that a loss of approximately 12% has taken place. The material that distils off consists primarily of carbon dioxide and water. If the same experiment is repeated using a solution of Cnsl in an inert high boiling solvent such as xylol, the result is the same, namely, a loss of about 12% in the weight of the Cnsl occurs. If, however, the Cnsl is mixed with an amine and is then subjected to the same treatment, the reaction product after the excess amine, etc. is driven off weighs more than the original Cnsl. Calculation reveals the fact that the increase in weight is roughly equivalent to one molecule of amine per molecule of anacardic acid present in the Cnsl. If the product is treated with a solution of caustic alkali, no amine is liberated as would have been the case if the amine were loosely tied up in the form of a simple salt (anacardate).

The amine reaction products of the invention are possessed of outstanding properties in the way of chemical reactivity, compatibility and physical characteristics, which render them eminently suitable for a large number of industrial applications. As an indication of their wide field of usefulness, it may be stated that generally speaking they may be employed for any of the purposes for which Cnsl and anacardic acid have either been used or suggested. They may be used as raw materials for the manufacture of printing inks, varnishes, lacquers, impregnating agents, synthetic resins and molding compositions. They may also be used as germicides and insecticides as well as wood preservatives. Their excellent solvent and plasticizing properties render them particularly well suited for incorporation with natural or synthetic gums, resins, rubbers, etc. They impart to the materials with which they have been incorporated exceptional plasticity, toughness, shock resistance, etc. They have the advantage over many of the materials previously used for this purpose in that they may be readily resinified in situ, ending up in the final product as resins which are wholly compatible with the materials with which they have been incorporated.

The amine reaction products can be resinified in much the same way and with the same reagents as can Cnsl and anacardic acid, but to much better advantage and with better results. The reagents with which the amine reaction products may be further reacted to form resins may be either resinous or non-resinous. As examples of non-resinous reagents may be mentoined aldehydes such as formaldehyde, furfural, etc., ketones such as acetone and its homologues, phenols such as carbolic acid, phenol alcohols such as saligenin, and drying and non-drying oils such as linseed oil, tung oil, rape seed oil, cotton seed oil, etc. As examples of resinous reagents may be mentioned condensation products of phenols with aldehydes, carbohydrates, ketones, etc., resins of the "Glyptal" type, resins of the ketone-aldehyde type, resins of the cumarone and indene type, resins of the styrol type and the ester gums, as well as the natural resins such as rosin, dragon's blood, copal, manila gum, fossil resin and gum accroides, etc.

The following may be mentioned among the advantages of the amine derivatives as reagents over Cnsl or anacardic acid: Most reagents appear to be very compatible with and dissolve very readily in the amine derivatives, the reaction proceeding very smoothly with very little foaming to the desired stage of reaction. This renders it possible to greatly simplify the plant equipment and to charge the reaction vessels to practically their full capacity. Furthermore, the danger of the product "kicking over" to a rubbery stage is greatly reduced. This is of particular importance in the case of reactions between the amine derivatives and very reactive substances such as furfural resins.

It is also to be noted that resins prepared from the amine derivatives of anacardic acid are very stable and have lower fusing points than those prepared from Cnsl or anacardic acid. This latter fact is of considerable importance, particularly in the production of molded articles, or where flow under pressure is desirable.

It follows from what has been said that the amine derivatives of anacardic acid lend themselves very readily to the preparation of many articles which have been previously made in whole or in part of other materials. Among such products may be mentioned electrical insulation, printing plates, phonograph records, noiseless gears, typewriter ribbons, stencil sheets, abrasive wheels, brake linings, etc.

In the production of abrasive wheels, the amine derivatives may be used as such to coat the abrasive grain for the purpose of promoting the adhesive of the pulverized resin bond thereto, as well as in the form of a synthetic resin to bond the grain.

The foregoing specification and description include the essential and distinctive thought of our invention, but it is to be distinctly understood that the same may be modified in various ways and/or combined with various other details without affecting the peculiar results obtained, and without departing from the spirit of the invention or the scope of the appended claims in which we intend to claim all the patentable novelty inherent in our invention.

We claim:

1. The method of producing a nitrogen-containing derivative of anacardic acid, which consists in preparing a mixture of anacardic acid and an amine having at least one reactive hydrogen atom attached to the nitrogen, said amine being present in the mixture in excess of one mole to each mole of anacardic acid, and heating said mixture to a temperature of not less than 450° F. until the reaction is substantially complete.

2. The method of producing a nitrogen-containing derivative of anacardic acid, which consists in preparing a mixture of anacardic acid and an aliphatic amine having at least one reactive hydrogen atom attached to the nitrogen, said amine being present in the mixture in excess of one mole to each mole of anacardic acid, and heating said mixture to a temperature of not less than 450° F. until the reaction is substantially complete.

3. The method of producing a nitrogen-containing derivative of anacardic acid, which consists in preparing a mixture of anacardic acid and ethylenediamine, the ethylenediamine being present in the mixture in excess of one mole to each mole of anacardic acid, and heating said mixture to a temperature of not less than 450° F. until the reaction is substantially complete.

4. The method of producing a nitrogen-containing derivative of anacardic acid, which consists in preparing a mixture of anacardic acid and an aromatic amine having at least one reactive hydrogen atom attached to the nitrogen, said amine being present in the mixture in excess of one mole to each mole of anacardic acid, and heating said mixture to a temperature of not less than 450° F. until the reaction is substantially complete.

5. The method of producing a nitrogen-containing derivative of anacardic acid, which consists in preparing a mixture of anacardic acid and aniline, the aniline being present in the mixture in excess of one mole to each mole of anacardic acid, and heating said mixture to a temperature of not less than 450° F. until the reaction is substantially complete.

6. The method of producing a nitrogen-containing derivative of anacardic acid, which consists in preparing a mixture of anacardic acid and a mixed amine having a hydrogen atom attached to the nitrogen, said amine being present in the mixture in excess of one mole to each mole of anacardic acid, and heating said mixture to a temperature of not less than 450° F. until the reaction is substantially complete.

7. The method of producing a nitrogen-containing derivative of anacardic acid, which consists in preparing a mixture of anacardic acid and methylphenylamine, the methylphenylamine being present in the mixture in excess of one mole to each mole of anacardic acid, and heating said mixture to a temperature of not less than 450° F. until the reaction is substantially complete.

8. The method of producing a nitrogen-containing derivative of anacardic acid, which consists in preparing a mixture of anacardic acid and an amine having at least one reactive hydrogen atom attached to the nitrogen, said amine being present in the mixture in excess of one mole to each mole of anacardic acid, refluxing said mixture, and finally heating said mixture to a temperature of not less than 450° F. until the reaction is substantially complete.

9. As a composition of matter, the product made in accordance with the method defined in claim 1.

10. As a composition of matter, the product made in accordance with the method defined in claim 3.

11. As a composition of matter, the product made in accordance with the method defined in claim 5.

12. As a composition of matter, the product made in accordance with the method defined in claim 7.

13. The method of producing a nitrogen-containing derivative of anacardic acid, which consists in preparing a mixture of an amine having at least one reactive hydrogen atom attached to the nitrogen and an anacardic material selected from the group consisting of anacardic acid and the esters of anacardic acid, said amine being present in the mixture in excess of one mole to each mole of said anacardic material, and heating said mixture to a temperature of not less than 450° F. until the reaction is substantially complete.

14. As a composition of matter, the product made in accordance with the method defined in claim 13.

EMIL E. NOVOTNY.
GEORGE KARL VOGELSANG.